United States Patent
Matsuda et al.

(10) Patent No.: US 9,590,261 B2
(45) Date of Patent: Mar. 7, 2017

(54) SOLID ELECTROLYTE, SOLID ELECTROLYTE MEMBRANE, FUEL BATTERY CELL, AND FUEL BATTERY

(75) Inventors: Motofumi Matsuda, Kobe (JP); Tadatoshi Murota, Kobe (JP); Tatsuya Takeguchi, Sapporo (JP)

(73) Assignees: SANTOKU CORPORATION, Hyogo (JP); National University Corporation Hokkaido University, Hokkaido (JP)

( * ) Notice: Subject to any disclaimer, the term of this patent is extended or adjusted under 35 U.S.C. 154(b) by 302 days.

(21) Appl. No.: 14/127,287

(22) PCT Filed: Jun. 19, 2012

(86) PCT No.: PCT/JP2012/065566
§ 371 (c)(1),
(2), (4) Date: Feb. 28, 2014

(87) PCT Pub. No.: WO2012/176749
PCT Pub. Date: Dec. 27, 2012

(65) Prior Publication Data
US 2014/0162174 A1    Jun. 12, 2014

(30) Foreign Application Priority Data
Jun. 20, 2011  (JP) .................. 2011-136764

(51) Int. Cl.
*H01M 8/10* (2016.01)
*H01B 1/12* (2006.01)
(Continued)

(52) U.S. Cl.
CPC ...... *H01M 8/1016* (2013.01); *C01G 49/0054* (2013.01); *C01G 51/68* (2013.01);
(Continued)

(58) Field of Classification Search
CPC ........................................ H01M 8/10
See application file for complete search history.

(56) References Cited

U.S. PATENT DOCUMENTS

2008/0145733 A1    6/2008  Asazawa et al.
2011/0143259 A1*   6/2011  Ueda .................. H01B 1/08
                                                    429/495

FOREIGN PATENT DOCUMENTS

EP    0 702 376 A1    3/1996
EP    2 306 569 A1    4/2011
(Continued)

OTHER PUBLICATIONS

European Patent Office, Communication dated Mar. 6, 2015 in counterpart Application No. 12803484.0.
(Continued)

*Primary Examiner* — Jacob Marks
(74) *Attorney, Agent, or Firm* — Sughrue Mion, PLLC (57) ABSTRACT

Provided is solid electrolyte utilizing a composite oxide of a RP-type structure, that is useful for achieving strong electromotive force and enhanced current-voltage characteristics of a fuel battery, has enhanced ion conductivity and sufficiently inhibited electronic conductivity, and is capable of intercalation of a large amount of water or hydrogen groups, as well as a solid electrolyte membrane, a fuel battery cell, and a fuel battery. The solid electrolyte and the solid electrolyte membrane of the present invention has been obtained by subjecting a particular composite oxide of a RP-type structure or a membrane thereof to a treatment of at least one of hydroxylation and hydration, and has a property that the mass determined by TG measurement at 400° C. is less than that at 250° C. by not less than 4.0%.

11 Claims, 3 Drawing Sheets

(51) Int. Cl.
  H01M 8/12       (2016.01)
  C01G 49/00      (2006.01)
  C01G 51/00      (2006.01)
  C04B 35/26      (2006.01)
  C04B 35/626     (2006.01)

(52) U.S. Cl.
  CPC ...... *C04B 35/2641* (2013.01); *C04B 35/6262* (2013.01); *H01B 1/122* (2013.01); *H01M 8/1246* (2013.01); *C01P 2002/72* (2013.01); *C01P 2002/88* (2013.01); *C04B 2235/3213* (2013.01); *C04B 2235/3227* (2013.01); *C04B 2235/6562* (2013.01); *C04B 2235/76* (2013.01); *C04B 2235/79* (2013.01); *Y02E 60/521* (2013.01); *Y02E 60/525* (2013.01); *Y02P 70/56* (2015.11)

(56) References Cited

FOREIGN PATENT DOCUMENTS

| JP | 8-119612 A | 5/1996 |
| JP | 2005-255465 A | 9/2005 |
| JP | 2006-244961 A | 9/2006 |
| WO | 2010/007949 A1 | 1/2010 |

OTHER PUBLICATIONS

Anonymous:"Ruddlesden-Popper Phase"; Wikipedia, the free encyclopedia, Aug. 27, 2014, pp. 1-3; XP002736126; Retrieved from the Internet: URL:http://en.wikipedia.org/w/index.php?title=Special:Book&bookcmd=download&collection id=66c1afa6366188f1f7bd27990dcd4d9e255e59b&writer=rdf2laterx&return_to=Ruddlesden-Proper+phase; retrieved Feb. 9, 2015.

Nishi et al.; "Structure and Property of layered Perovskite Type Compounds (La, Sr)$_{n+1}$Fe$_n$O$_{3n+1}$ and Intercalation of LaSr$_3$Fe$_3$O$_{10\text{-}[d]}$";Key Engineering Materials, vol. 169-170, Jan. 1, 1999; pp. 235-238; XP055168300; DOI:10.4028/www.scientifuc.net/KEM.169-170.235.

Takahashi et al.;"Solid Alkaline Fuel Cell Composed of Layered Perovskite-Type Oxide LaSr"; ECS Transactions; May 1, 2011-May 6, 2011; pp. 267-272; XP055168302; ISSN:1938-5862; Doi :10.1149/1.3655710.

Watanabe et al. :"Performance of Solid Alkaline Fuel Cells Employing Layered Perovskite-Type Oxides as Electrolyte"; ECS Transactions; Jan. 1, 2010; pp. 1825-1829; XP 055168675; ISSN: 1938-5862; DOI: 10.1149/1.3484672.

D. Pelloquin et al., "Novel, Oxygen-Deficient $n$=3 RP-Member Sr$_3$NdFe$_3$O$_{9\text{-}\delta}$ and Its Topotactic Derivatives", Chem. Mater. 2004, pp. 1715-1724, vol. 16.

International Searching Authority International Search Report for PCT/JP2012/065566 dated Sep. 11, 2012.

* cited by examiner

SOLID ELECTROLYTE, SOLID ELECTROLYTE MEMBRANE, FUEL BATTERY CELL, AND FUEL BATTERY

CROSS REFERENCE TO RELATED APPLICATIONS

This application is a National Stage of International Application No. PCT/JP2012/065566 filed Jun. 19, 2012, claiming priority based on Japanese Patent Application No. 2011-136764 filed Jun. 20, 2011, the contents of all of which are incorporated herein by reference in their entirety.

FIELD OF ART

The present invention relates to a solid electrolyte, a solid electrolyte membrane, a fuel battery cell, and a fuel battery having the fuel battery cell.

BACKGROUND ART

Fuel batteries have been expected to be put to practical use as electrical power generation sources having a high energy conversion rate and low environmental burden. A known example of the fuel batteries has a cell with a solid electrolyte membrane and a catalyst layer. There has been proposed a polymer electrolyte fuel battery employing a polymer electrolyte membrane as a solid electrolyte membrane and capable of operation at a temperature of as low as about 80° C. However, due to large volume use of expensive platinum (Pt) as a catalytic metal of the catalyst layer, cost has been a bar to practical use of the polymer electrolyte fuel battery.

For practical use of fuel batteries, reduction in usage of Pt has been proposed (e.g. in Patent Publication 1). However, the fuel battery free of Pt disclosed in Patent Publication 1 requires hydrazine ($N_2H_4$), which has pungent odor and is flammable, as the fuel, which imposes safety and other problems.

As a solution to this problem, there has been proposed a technology wherein a metal composite oxide is used as a solid electrolyte. However, since a solid electrolyte used in a fuel battery is generally required to have ion conductivity, use of a metal composite oxide requires a technology for expressing its ion conductivity.

In this regard, Patent Publication 2 proposes a fuel battery employing, as a solid electrolyte of a metal composite oxide, $LaSr_3Fe_3O_{10}$ having Ruddlesden-Popper type structure and capable of achieving strong electromotive force even under the conditions of as low as about 20 to 80° C. The publication proposes to enhance the ion conductivity of the solid electrolyte used in this fuel battery by, for example, calcining a pre-baked $LaSr_3Fe_3O_{10}$ pellet at about 1400 to 1500° C., and subjecting the calcined pellet to steam treatment, preferably hydrogen reduction and steam treatment, to intercalate water or hydroxyl groups.

Patent Publication 2 teaches that the steam treatment of the $LaSr_3Fe_3O_{10}$ solid electrolyte is carried out preferably at 20 to 150° C. and 30 to 100% relative humidity under 0.1 to 1 MPa pressure for 3 to 48 hours, particularly preferably at 25° C. and 100% relative humidity under 0.1 MPa pressure for 3 hours.

On the other hand, Non-patent Publication 1 reports that thermogravimetric (TG) analysis may be employed for determination of the amount of water or hydroxyl groups intercalated into s solid electrolyte through the above-mentioned steam treatment. Specifically, the publication discloses that, in $NdSr_3Fe_3O_{8.5}$ having water incorporated in its structure, the water is present as free water or hydroxyl groups, which correspond to the two steps of mass losses confirmed by TG analysis, i.e., mass loss beyond 90° C. representing departure of free water and mass loss at about 250° C. representing departure of hydroxyl groups.

The amount of water or hydroxyl groups intercalated into a solid electrolyte, which is determined by TG analysis, was indeed determined of the $LaSr_3Fe_3O_{10}$ solid electrolyte disclosed in Patent Publication 2, and FIG. 15 therein shows that the mass loss over 20° C. to 400° C. was a little over 1%. Such a mass loss cannot represent a sufficient amount of water or hydroxyl groups intercalated into the solid electrolyte, and further enhancement of ion conductivity of a solid electrolyte is desired.

Patent Publication 1: JP-2006-244961-A
Patent Publication 2: WO 2010/007949
Non-patent Publication 1: D. Pelloquin et al. Chem. Mater. 1715-1724, 16 (2004)

SUMMARY OF THE INVENTION

It is an object of the present invention to provide a solid electrolyte obtained from a composite oxide of a Ruddlesden-Popper type structure, a membrane thereof, and a fuel battery cell utilizing the same, which electrolyte is useful for achieving strong electromotive force and enhanced current-voltage characteristics of a fuel battery, has an improved ion conductivity and sufficiently inhibited electronic conductivity, and is capable of intercalation of a large amount of water or hydroxyl groups.

It is another object of the present invention to provide a fuel battery capable of providing strong electromotive force and enhanced current-voltage characteristics even at low temperatures.

The present inventors, in an attempt to achieve the above objects, have found out that use of a particular composite oxide or a membrane thereof as a solid electrolyte or a solid electrolyte membrane with a particular treatment of at least one of hydroxylation and hydration, results in a solid electrolyte having a higher ion conductivity and sufficiently inhibited electronic conductivity, and capable of intercalation of a larger amount of water and hydroxyl groups, compared to the solid electrolyte and the membrane thereof disclosed in Patent Publication 2, to thereby complete the present invention.

According to the present invention, there is provided a solid electrolyte obtained by subjecting a composite oxide of a Ruddlesden-Popper (sometimes abbreviated as RP hereinbelow) type structure represented by formula (1) or (2) to a treatment of at least one of hydroxylation and hydration, wherein said solid electrolyte has a property that a mass determined by thermogravimetric (TG) measurement at 400° C. is less than a mass determined by TG measurement at 250° C. by not less than 4.0%:

$$(ABO_3)_n\text{-}AO \tag{1}$$

$$A_{n+1}B_nO_{3n+1} \tag{2}$$

wherein A stands for a transition metal element and at least one rare earth element; B stands for Fe alone or Fe and at least one of Co, Mn, Cu, Ti, Pd, Ni, Nb, and Ta; and n denotes an integer of 1 to 3.

According to the present invention, there is also provided a solid electrolyte membrane comprising the solid electrolyte.

According to the present invention, there is further provided a solid electrolyte membrane obtained by forming a composite oxide of a RP-type structure represented by the above formula (1) or (2) into a membrane, and subjecting said membrane to a treatment of at least one of hydroxylation and hydration, wherein said solid electrolyte membrane has a property that a mass determined by TG measurement at 400° C. is less than a mass determined by TG measurement at 250° C. by not less than 4.0%.

According to the present invention, there is also provided a fuel battery cell comprising the solid electrolyte membrane.

According to the present invention, there is further provided a fuel battery comprising the fuel battery cell.

Having the above-described constructions, the solid electrolyte or a membrane thereof according to the present invention achieves sufficiently high ion conductivity and low internal resistance. With the use of such solid electrolyte or a membrane thereof, fuel batteries may be produced that provide sufficiently strong electromotive force and enhanced current-voltage characteristics even at low temperatures.

PREFERRED EMBODIMENTS OF THE INVENTION

The present invention will now be explained in detail.

The solid electrolyte or a membrane thereof according to the present invention is obtained by subjecting a composite oxide of a RP-type structure represented by the formula (1) or (2) mentioned above, or a membrane formed of this composite oxide, to a treatment of at least one of hydroxylation and hydration (sometimes referred to as "hydration/hydroxylation treatment" hereinbelow). The RP-type structure is a layered structure having perovskite layers $ABO_3$ and rock salt layers $AO$ alternately stacked.

In the formula (1) or (2), A stands for a transition metal element and at least one rare earth element, B stands for Fe alone or Fe and at least one of Co, Mn, Cu, Ti, Pd, Ni, Nb and Ta, and n denotes an integer of 1 to 3.

Examples of this composite oxide may include $LaSr_3Fe_3O_{10}$ and $LaSr_3Fe_{1.5}Co_{1.5}O_{10}$.

The composite oxide may be prepared, for example by solid phase reaction.

$LaSr_3Fe_3O_{10}$ may be prepared, for example, by placing prescribed amounts of lanthanum oxide, strontium carbonate, and iron oxide in a ball mill, and sufficiently homogeneously mixing these components to obtain a sample. The sample is molded into a pellet, and calcined preferably at about 1000 to 1400° C. for 2 to 48 hours, to thereby give layered $LaSr_3Fe_3O_{10}$.

$LaSr_3Fe_{1.5}Co_{1.5}O_{10}$ may be prepared, for example, by placing prescribed amounts of lanthanum oxide, strontium carbonate, iron oxide, and cobalt oxide in a ball mill, and sufficiently homogeneously mixing these components to obtain a sample. The sample is molded into a pellet, and calcined preferably at about 1000 to 1400° C. for 2 to 48 hours, to thereby give layered $LaSr_3Fe_{1.5}Co_{1.5}O_{10}$.

The atmosphere of the calcination may be reduced-pressure, inert gas, or a combination of these, and is not limited to air as long as the structure of the composite oxide is not destroyed by reduction.

The calcination may be preceded by pre-baking. When pre-baking is employed, the pellet obtained as above is pre-baked preferably at 900 to 1400° C., pulverized, and re-molded into a pellet in the same way as above, and then calcined.

The hydration/hydroxylation treatment may be carried out, for example, by leaving the composite oxide or a membrane formed of this composite oxide, to stand in an environment at a temperature of 10 to 50° C., preferably 20 to 40° C., a relative humidity of 10 to 50%, preferably 20 to 40%, under a pressure of 0.08 to 0.2 MPa, preferably 0.1 to 0.15 MPa, usually for 48 to 480 hours, preferably 72 to 240 hours.

At too high a temperature or a relative humidity, or for too short a standing time, the hydration/hydroxylation treatment is not sufficient, resulting in a solid electrolyte of a lower ion conductivity. For example, under the preferred conditions disclosed in Patent Publication 2 discussed above, the high water and/or hydroxyl group content of the solid electrolyte or a membrane thereof of the present invention to be discussed later, cannot be attained.

The present inventors have made intensive researches for the conditions of the treatment of at least one of hydroxylation and hydration discussed above to find out that, contrary to the preferred conditions disclosed in Patent Publication 2, long-time standing in a low-temperature, low-relative humidity environment will allow a larger amount of water molecules to intercalate into the composite oxide without aggregation.

The hydration/hydroxylation treatment may be performed on solid electrolyte powder, i.e., before formed into a solid electrolyte membrane, or after formed into a solid electrolyte membrane to be discussed below.

The solid electrolyte or a membrane thereof according to the present invention obtained by the above method has a property that its mass determined by TG measurement at 400° C. is less than its mass determined by TG measurement at 250° C. by not less than 4.0%, preferably 4.5 to 7.0%.

The TG measurement may be carried out in a thermogravimetric analyzer, for example, with about 20 mg of a coarsely ground sample of the solid electrolyte or a membrane thereof (pellet) of the present invention over the range of 20° C. to 400° C. The measurement is carried out in a flowing $N_2$ at 60 ml/min. The temperature is raised by 10° C./min.

The solid electrolyte or a membrane thereof of the present invention has an X-ray diffraction pattern determined at 2θ/degree (CuKα)=2 to 40° with a strongest peak preferably near 5°. This strongest peak suggests that water or hydroxyl groups are intercalated in a sufficient amount with uniform distribution The solid electrolyte or a membrane thereof of the present invention has an X-ray diffraction pattern determined at 2θ/degree (CuKα)=2 to 40° having a peak observed near 5° with a diffraction intensity larger than 1.0 time, preferably 1.5 times the intensity of a peak near 32°. Such diffraction intensity further suggests that water or hydroxyl groups are intercalated in a sufficient amount with uniform distribution.

The X-ray diffraction may be performed under the conditions to be described in Examples.

The solid electrolyte membrane according to the present invention may be any membrane containing the solid electrolyte of the present invention or formed of the composite oxide discussed above, subjected to the hydration/hydroxylation treatment, and having the particular property discussed above, and may be in the form of a pellet or a thin film having the solid electrolyte of the present invention layered on a porous metal substrate or the like.

The average thickness of the solid electrolyte membrane of the present invention is preferably 5 to 1000 µm, more preferably 5 to 500 µm. With less than 5 µm average thickness, the mechanical strength of the solid electrolyte membrane tends to be insufficient, and cross-leakage may occur. With over 1000 µm thickness, the resistance in the solid electrolyte membrane tends to be higher.

The solid electrolyte membrane of the present invention may optionally contain oxides or impurities to the extent that its functions are not impaired.

The solid electrolyte membrane of the present invention may be prepared, for example, by first molding the solid electrolyte powder prior to the hydration/hydroxylation treatment into a membrane of a desired shape. In the case of a pellet shape, it is preferred to mold the solid electrolyte powder in a tablet mold under a pressure of 60 to 100 MPa for 1 to 30 minutes.

When a porous metal substrate is used, a slurry for forming a solid electrolyte layer is prepared containing, for example, the solid electrolyte powder prior to the hydration/hydroxylation treatment, a binder, and a solvent, and applied to one or both sides of the substrate with a doctor blade or a spray to dry. The binder and the solvent used here preferably have a boiling point of not higher than 250° C. The drying may preferably be performed in the air at 60 to 250° C. for 1 minute to 20 hours, and the solid electrolyte layer and the substrate are preferably pressed at 40 to 60 MPa for 1 to 30 minutes to compact the solid electrolyte layer.

The solid electrolyte membrane of the present invention may be obtained by, after the molding into a membrane of a desired shape, calcination preferably at 1000 to 1400° C. for about 2 to 48 hours, followed by the hydration/hydroxylation treatment.

The binder may either be organic or inorganic, and is not particularly limited as long as it is dispersed or dissolved with metal oxide powder in a solvent, and when the solvent is eliminated, binds the powder particles together. The binder may be, for example, polytetrafluoroethylene, polyvinylidene fluoride, polyvinyl acetate, polymethylmethacrylate, styrene-butadiene copolymer, acrylonitrile-butadiene copolymer, carboxymethyl cellulose, polyvinyl alcohol, fluoro-rubber, or ethylene-butadiene rubber. The solvent may be, for example, N-methylpyrrolidinone, tetrahydrofuran, ethylene oxide, methyl ethyl ketone, cyclohexanone, methyl acetate, methyl acrylate, dimethyltriamine, dimethylformamide, dimethylacetamide, or ethylene glycol.

Other methods for producing the membrane than those discussed above may include gas-phase methods, such as physical vapor deposition (PVD) including vacuum deposition, sputtering, ion plating, and PLD (laser ablation), and chemical vapor deposition (CVD) including thermal CVD, plasma CVD, and MOCVD; and coating methods, such as doctor blading as discussed above, spin coating, sol-gel process, and spraying. There is no particular limitation to the method as long as membrane formation is achieved.

The fuel battery cell according to the present invention is a cell equipped with the solid electrolyte membrane of the present invention, one side of which is usually provided with a catalyst layer, and having a zone for hydrogen supply and a zone for oxygen supply with moisture, with the solid electrolyte membrane intervening therebetween. The catalyst layer acts as an anode. The solid electrolyte acts also as a cathode, so that fuel battery performance is provided without a cathode catalyst.

The anode (catalyst layer) may be metal mesh plated with a precious metal, or a catalyst layer formed by applying, to a substrate, a paste or a slurry of catalyst powder which is composed of catalyst support carrying a precious metal, mixed with a solvent and optionally a binder. The catalyst layer may alternatively be formed by applying the above paste or slurry to the solid electrolyte membrane of the present invention. The catalyst support may be oxide powder or carbon powder.

The precious metal with which the metal mesh is plated may be, for example, Pt, Pd, Ru, or Ag. The metal mesh is required to have an area suitable for the size of the cell, and preferably has a thickness of 0.03 to 1.0 mm. The material of the metal mesh is not particularly limited as long as it is electrically conductive.

The catalyst powder composed of oxide powder carrying a precious metal may be prepared using Pt, Pd, Ru, or Ag as the previous metal. When Pd is used, a $Pd(NH_3)_2(NO_2)_2$ nitrate solution is added to the solid electrolyte powder prior to the hydration/hydroxylation treatment, which is made to undergo impregnation on a water bath, and deprived of moisture by evaporation until powdered. The resulting sample is placed in a furnace, and calcined in the air. The calcination is preferably carried out at 400 to 600° C. for 30 minutes to 4 hours. Through this process, a metal oxide catalyst carrying Pd in the amount of 12 to 15 mass % of the solid electrolyte powder may be obtained.

Then the metal oxide carrying Pd is thoroughly kneaded with a solvent, and a binder is optionally added to prepare a paste (slurry) of these components. The paste is applied to foamed Ni or the like metal substrate at a rate of 0.5 to 40 $mg/cm^2$, dried, and calcined in the air to produce an anode (catalyst layer). The drying is preferably performed at 60 to 100° C. for 1 minute to 20 hours, and the calcination is preferably performed at 300 to 500° C. for 30 minutes to 5 hours.

In the fuel battery cell of the present invention, the interface between the solid electrolyte membrane and the catalyst layer, and the contact area between the precious metal catalyst and the solid electrolyte contribute to the reaction of the fuel battery.

The fuel battery of the present invention may be of any structure as long as it contains the fuel battery cell of the present invention, and the remaining structure is not particularly limited and may be fabricated with reference to known fuel batteries. An embodiment of the fuel battery according to the present invention will be described with reference to FIG. 1, to which the present invention is not limited.

Figure 1:
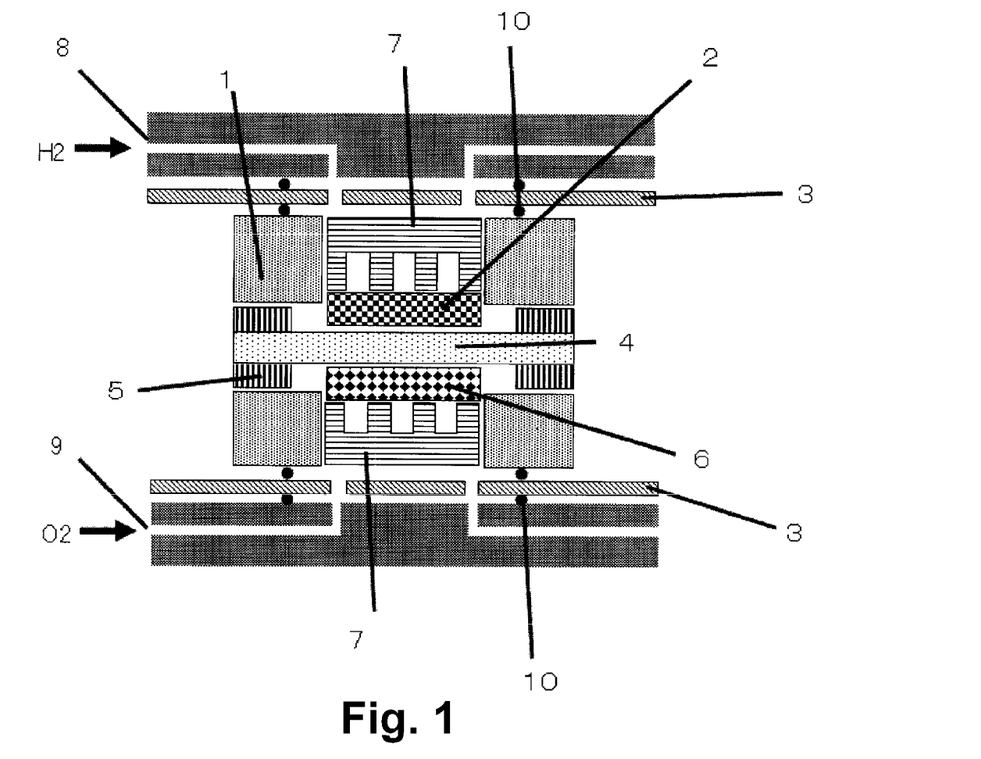
FIG. 1 is a schematic explanatory view of an embodiment of the fuel battery according to the present invention.

FIG. 1 is a schematic explanatory view showing an embodiment of the fuel battery according to the present invention. In FIG. 1, 1 refers to cell frames, between which solid electrolyte membrane (pellet) 4 is held via Teflon (registered trademark) seals 5. Numeral 2 refers to an anode (catalyst layer), 6 refers to a cathode, and each of these is disposed in each cell frame 1 so as to be in sufficient contact with the pellet 4, and fixed with separator 7. O-ring 10 is attached to the outer side of each cell frame 1, and covered with load plate 3.

Numeral 8 refers to a $H_2$ gas supply port for supplying $H_2$ gas into the cell held between the load plates 3 from the side of the anode 2, and 9 refers to an $O_2$ gas supply port for supplying $O_2$ gas humidified to saturation into the cell held between the load plates 3 from the side of the cathode 6. The $H_2$ gas supply port 8 and the $O_2$ gas supply port 9 are, as shown in the figure, connected to the piping for supplying $H_2$ gas into the cell from the side of the anode 2 and the piping for supplying $O_2$ gas humidified to saturation into the cell from the side of the cathode 6, respectively. Each piping is provided with a valve (not shown) for controlling the supply rate of the gas, or the like.

The anode 2 and the cathode 6 are each connected to a conductive wire, which may be, for example, a copper, nichrome, or platinum wire.

Next, a method of electricity generation with the above fuel battery is discussed.

With the supply of $H_2$ gas through the $H_2$ gas supply port 8, the reaction represented by the formula (3) below proceeds at the anode 2, whereas with the supply of $O_2$ gas humidified to saturation through the $O_2$ gas supply port 9, the reaction represented by the formula (4) below proceeds at the cathode 6.

The gas supplied through the $H_2$ gas supply port 8 may either be hydrogen alone or a mixed gas of hydrogen and an insert gas. The gas supplied through the $O_2$ gas supply port 9 may be of any gas as long as it contains oxygen and moisture, and humidified oxygen or humidified air may be used.

$$2H_2 + 4OH^- \rightarrow 4H_2O + 4e^- \quad (3)$$

$$O_2 + 2H_2O + 4e^- \rightarrow 4OH^- \quad (4)$$

The fuel battery of the present invention has an operation temperature as wide as 10 to 800° C., and is capable of generating sufficient electricity even at relatively lower temperatures, for example, 20 to 80° C.

EXAMPLES

The present invention will now be explained with reference to Examples, which do not limit the present invention.

Example 1

Preparation of Pellet

A $LaFe_3Sr_3O_{10}$ pellet was prepared according to steps (1) to (6) below.

(1) 3.68 g of lanthanum oxide ($La_2O_3$, WAKO PURE CHEMICALS, special grade), 10.00 g of strontium carbonate ($SrCO_3$, WAKO PURE CHEMICALS, chemical use), and 5.41 g of iron oxide ($Fe_2O_3$, WAKO PURE CHEMICALS, first grade) were placed in a planetary ball mill (FRITSCH, trade name "pulverisette"), and mixed at 300 RPm for 1 hour.

(2) The obtained powdery solid was molded into a pellet of 20 mm diameter and 2 mm thickness in a tablet mold (manufactured by JASCO CORPORATION) under 20 MPa for a holding time of 5 minutes.

(3) The molded pellet was heated in the air at 10 K/min up to 1000° C. and 50 K/min from 1000 to 1400° C., and pre-baked at 1400° C. for 3 hours.

(4) After air-cooled, the pellet was ground in an alumina mortar, and the ground powder was placed in a planetary ball mill and pulverized at 300 RPm for 1 hour.

(5) The obtained powdery solid was again molded into a pellet of 20 mm diameter and 1.2 mm thickness in the tablet mold under 60 MPa for a holding time of 10 minutes.

(6) The obtained pellet was heated in the air at 10 K/min up to 1400° C., and calcined at 1400° C. for 3 hours.

<Hydroxylation and/or Hydration of Pellet (Standing Treatment)>

The $LaFe_3Sr_3O_{10}$ pellet obtained from (6) above was left to stand at 25° C. and 25% relative humidity under 0.1 MPa pressure for 7 days to prepare a solid electrolyte membrane (pellet).

<Structural Analysis by X-Ray Diffraction (XRD)>

Figure 2:
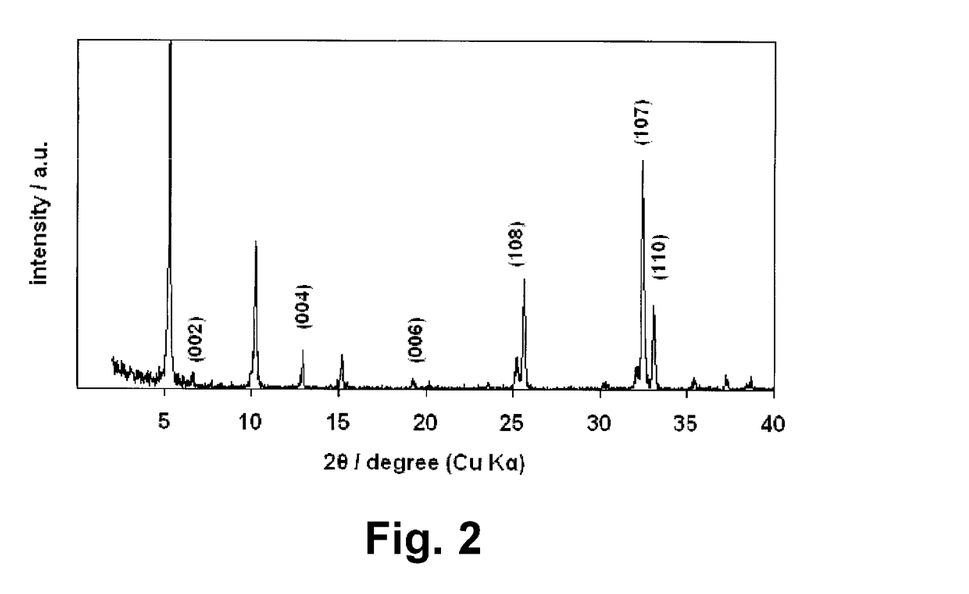
FIG. 2 is a graph showing the result of structural analysis by X-ray diffraction (XRD) of the solid electrolyte membrane (pellet) prepared in Example 1.

The obtained solid electrolyte membrane (pellet) was subjected to surface structural analysis in a powder X-ray diffractometer (RIGAKU, RINT-Ultima+) under the conditions below. The result is shown in FIG. 2.

As a result of the structural analysis, diffraction peaks corresponding to the (002), (004), (006), (108), (107), and (110) planes of $LaFe_3Sr_3O_{10}$ were observed mainly near 2θ=6.7°, 13.0°, 19.4°, 25.6°, 32.5°, and 33.1°, respectively. Diffraction peaks were also observed near 5°, 10°, and 15°, which respectively correspond to the (002), (004), and (006) planes and shifted by structural expansion due to intercalation of water. No shift was observed of the remaining (108), (107), and (110) planes.

Radiation source: CuKα; wavelength: 0.154056 nm; tube voltage: 40 kV; current: 20 mA; measurement range 2θ: 2 to 40°; scanning axis: 2θ/θ; scan step: 0.02°; scan speed: 2°/min; scattering slit: ½°; receiving slit: 0.15 mm.

<Preparation of Anode (Catalyst Layer)>

Metal mesh of 0.1 mm thick plated with Pd was punched out in a diameter of 10 mm to prepare an anode.

<Electricity Generation Test>

Figure 3:
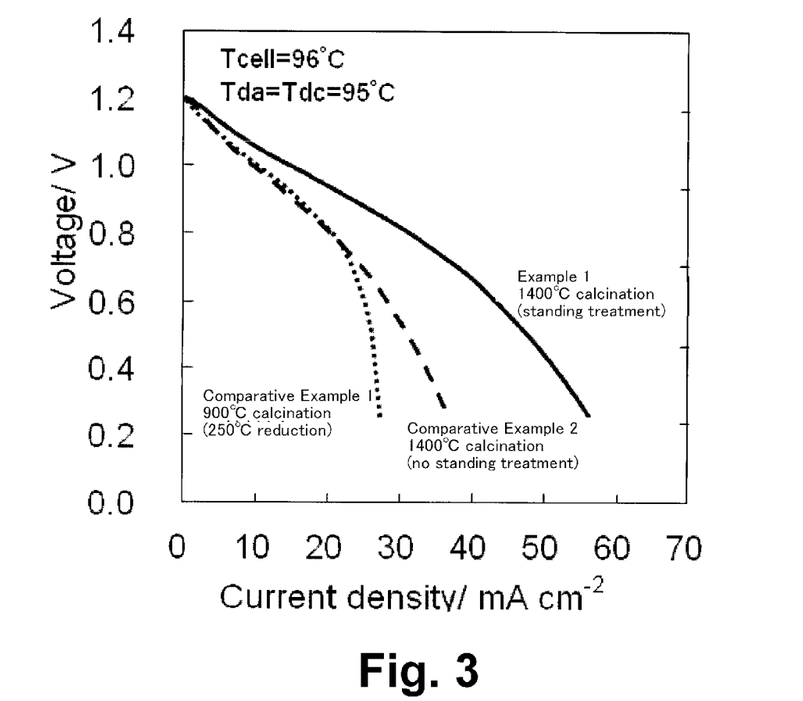
FIG. 3 is a graph showing the current-voltage characteristics of the fuel batteries prepared in Example 1, Comparative Examples 1 and 2.

The solid electrolyte membrane (pellet) prepared as above was placed in the cell shown in FIG. 1, and an electricity generation test was conducted. The results are shown in FIG. 3. The test procedure was as follows.

On cell frame 1 were placed Teflon (registered trademark) seal 5, pellet 4, Teflon (registered trademark) seal 5, and cell frame 1 one on another in this order, to hold the pellet 4 between the cell frames 1.

Next, anode 2 was placed in one of the cell frames 1 so as to be in sufficient contact with the pellet 4, and fixed with separator 7 inserted into the cell frame 1. O-ring 10 was attached to the outer side of the cell frame 1, and covered with load plate 3.

Similarly, on the cathode side, cathode 6 was placed in the other of the cell frames 1 so as to be in sufficient contact with the pellet 4, and fixed with separator 7 inserted into the cell frame 1. As the cathode, carbon paper was used as a collector. O-ring 10 was attached to the outer side of the cell frame 1, and covered with load plate 3.

The cell 1 held between the load plates 3 was placed between a member having $H_2$ gas supply port 8 and a member having $O_2$ gas supply port 9 as shown in the figure, clamped under an appropriate pressure, and confirmed that no leakage was observed.

Then, the cell was held at 96° C. in a 50 ml/min flow of hydrogen humidified to saturation at 95° C. introduced through the $H_2$ gas supply port 8 and a 50 ml/min flow of oxygen similarly humidified to saturation at 95° C. introduced through the $O_2$ gas supply port 9.

When the OCV across the anode-cathode electrodes was confirmed to be constant, an electricity generation test was conducted.

<TG Measurement>

Figure 6:
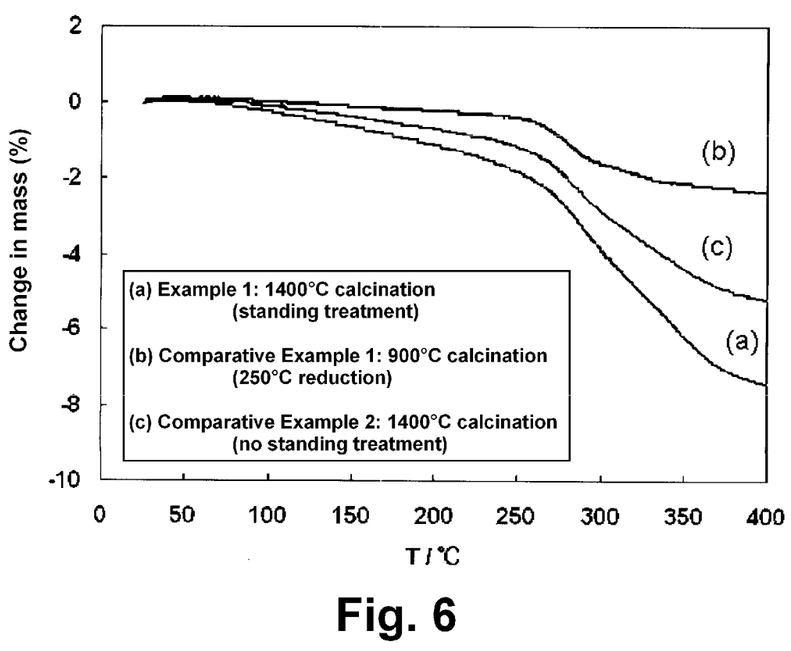
FIG. 6 is a graph showing the results of TG measurements conducted in Example 1, Comparative Examples 1 and 2.

The solid electrolyte membrane (pellet) taken out of the fuel battery cell after the electricity generation test conducted above was coarsely ground, from which a 20 mg sample was measured out. The sample was placed in a thermogravimetric (TG) analyzer, and the change in mass of the sample was monitored while the temperature was raised from 20° C. to 400° C. The sample was demonstrated to have a property that the mass determined by the TG measurement at 400° C. was decreased by 5.6% from that at 250° C. The result is shown in FIG. 6. As can be seen from FIG. 6, mass change was observed which is believed to result from departure of OH groups and water molecules.

Example 2

A solid electrolyte membrane (pellet) was prepared in the same way as in Example 1 except that the standing treatment of the pellet was for 18 days. The as-prepared pellet was subjected to the electricity generation test and the TG measurement in the same way as in Example 1. The sample was demonstrated to have a property that the mass determined by the TG measurement at 400° C. was decreased by 5.4% from that at 250° C.

Example 3

A solid electrolyte membrane (pellet) was prepared in the same way as in Example 1 except that the standing treatment of the pellet was for 5 days. The as-prepared pellet was subjected to the electricity generation test and the TG measurement in the same way as in Example 1. The sample was demonstrated to have a property that the mass determined by the TG measurement at 400° C. was decreased by 5.0% from that at 250° C.

Comparative Example 1

Preparation of Pellet

Figure 4:
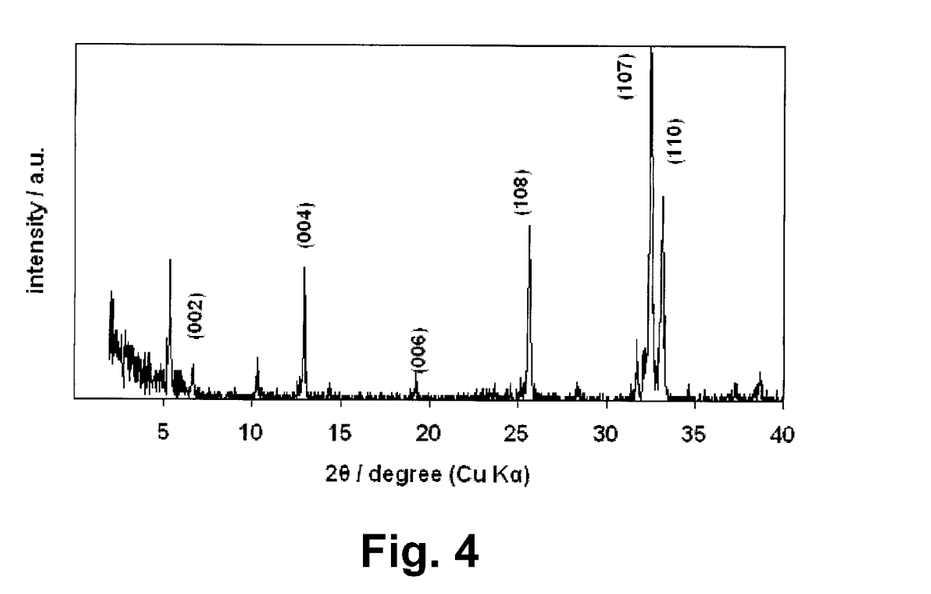
FIG. 4 is a graph showing the result of structural analysis by X-ray diffraction (XRD) of the solid electrolyte membrane (pellet) prepared in Comparative Example 1.

A solid electrolyte membrane (pellet) was prepared in the same way as in Example 1 except that the calcination in step (6) was performed at 900° C. for 10 hours following heating at 10K/min up to 900° C. The solid electrolyte membrane (pellet) was subjected to the surface structural analysis in the powder X-ray diffractometer. The result is shown in FIG. 4. No peak shift due to intercalation of water was observed unlike in Example 1.

<Reduction Treatment>

The solid electrolyte membrane (pellet) obtained above was placed in the cell 1 shown in FIG. 1 in the same way as in Example 1. The cell was heated at 3 K/min up to 250° C. in a 50 ml/min flow of hydrogen introduced through the $H_2$ gas supply port 8 and a 50 ml/min flow of oxygen introduced through the $O_2$ gas supply port 9, and held for 2 hours to reduce.

<Electricity Generation Test>

The electricity generation test was conducted in the same way as in Example 1 except that the cell was air-cooled after the reduction treatment. The result is shown in FIG. 3.

<TG Measurement>

The solid electrolyte membrane (pellet) taken out of the fuel battery cell after the electricity generation text conducted above was coarsely ground, from which a 20 mg sample was measured out. The sample was placed in a thermogravimetric (TG) analyzer, and the change in mass of the sample was monitored while the temperature was raised from 20° C. to 400° C. The sample was demonstrated to have a property that the mass determined by the TG measurement at 400° C. was decreased by 2.0% from that at 250° C. The result is shown in FIG. 6.

Comparative Example 2

Figure 5:
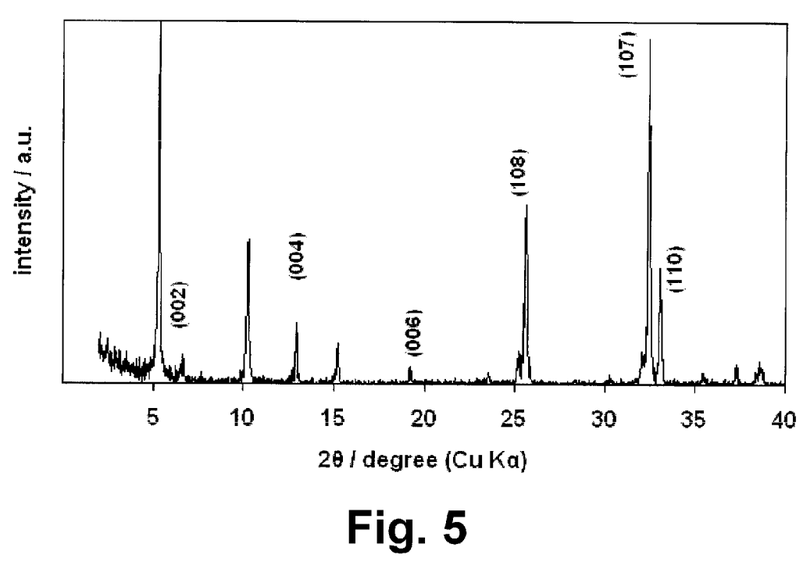
FIG. 5 is a graph showing the result of structural analysis by X-ray diffraction (XRD) of the solid electrolyte membrane (pellet) prepared in Comparative Example 2.

Example 1 was followed except that the 7-day-standing treatment following steps (1) to (6) for preparation of a pellet in Example 1 was replaced with air cooling for 12 hours. After the electricity generation test, the solid electrolyte membrane (pellet) was subjected to the surface structural analysis in the powder X-ray diffractometer. The result is shown in FIG. 5. The sample was demonstrated to have a property that the mass determined by the TG measurement at 400° C. was decreased by 3.8% from that at 250° C. The result is shown in FIG. 6.

Comparative Example 3

Example 1 was followed except that the calcination in step (6) was performed at 900° C. for 10 hours following heating at 10 K/min up to 900° C., and the standing treatment was carried out for 3 months. The sample showed no change in mass determined by the TG measurement at 400° C., compared to that at 250° C.

Comparative Example 4

Example 1 was followed except that the standing treatment was carried out for 1 day. The sample was demonstrated to have a property that the mass determined by the TG treatment at 400° C. was decreased by 3.7% from that at 250° C.

DESCRIPTION OF REFERENCE NUMERAL

1: cell frame; 2: anode; 3: load plate; 4: pellet; 5: Teflon (registered trademark) seal; 6: cathode; 7: separator; 8: $H_2$ gas supply port; 9: $O_2$ gas supply port; 10: O-ring

What is claimed is:

1. A solid electrolyte obtained by subjecting a composite oxide of a Ruddlesden-Popper-type structure represented by the formula (1) or (2) to a treatment of at least one of hydroxylation and hydration, wherein said solid electrolyte has a property that a mass determined by thermogravimetric (TG) measurement at 400° C. is less than a mass determined by TG measurement at 250° C. by not less than 4.0%:

$$(ABO_3)_n\text{-}AO \quad (1)$$

$$A_{n+1}B_nO_{3n+1} \quad (2)$$

wherein A stands for La and Sr; B stands for Fe alone or Fe and at least one of Co, Mn, Cu, Ti, Pd, Ni, Nb, and Ta; and n denotes an integer of 1 to 3.

2. The solid electrolyte according to claim 1, wherein an X-ray diffraction pattern of said solid electrolyte determined at 2θ/degree (CuKα)=2 to 40° has a strongest peak observed near 5°.

3. The solid electrolyte according to claim 1, wherein an X-ray diffraction pattern of said solid electrolyte determined at 2θ/degree (CuKα)=2 to 40° has a peak observed near 5° with an intensity larger than 1.00 time an intensity of a peak observed near 32°.

4. The solid electrolyte according to claim 1, wherein said treatment of at least one of hydroxylation and hydration is carried out by, following calcination of said composite oxide at 1000 to 1400° C. for 2 to 48 hours, leaving the composite oxide to stand at 10 to 50° C. and 10 to 50% relative humidity for 48 to 480 hours.

5. A solid electrolyte membrane comprising the solid electrolyte of claim 1.

6. A solid electrolyte membrane obtained by forming a composite oxide of a Ruddlesden-Popper-type structure represented by the formula (1) or (2) into a membrane, and subjecting said membrane to a treatment of at least one of hydroxylation and hydration, wherein said solid electrolyte membrane has a property that a mass determined by thermogravimetric (TG) measurement at 400° C. is less than a mass determined by TG measurement at 250° C. by not less than 4.0%:

$$(ABO_3)_n\text{-}AO \tag{1}$$

$$A_{n+1}B_nO_{3n+1} \tag{2}$$

wherein A stands for La and Sr; B stands for Fe alone or Fe and at least one of Co, Mn, Cu, Ti, Pd, Ni, Nb, and Ta; and n denotes an integer of 1 to 3.

7. The solid electrolyte membrane according to claim 5, wherein an X-ray diffraction pattern of said solid electrolyte membrane determined at 2θ/degree (CuKα)=2 to 40° has a strongest peak observed near 5°.

8. The solid electrolyte membrane according to claim 5, wherein an X-ray diffraction pattern of said solid electrolyte membrane determined at 2θ/degree (CuKα)=2 to 40° has a peak observed near 5° with an intensity larger than 1.00 time an intensity of a peak observed near 32°.

9. The solid electrolyte membrane according to claim 6, wherein said treatment of at least one of hydroxylation and hydration is carried out by, following calcination of said membrane at 1000 to 1400° C. for 2 to 48 hours, leaving said membrane to stand at 10 to 50° C. and 10 to 50% relative humidity for 48 to 480 hours.

10. A fuel battery cell comprising the solid electrolyte membrane of claim 5.

11. A fuel battery comprising the fuel battery cell of claim 10.

* * * * *